(12) United States Patent
Hundscheidt et al.

(10) Patent No.: US 8,572,620 B2
(45) Date of Patent: Oct. 29, 2013

(54) RESOURCE MANAGEMENT

(75) Inventors: Frank Hundscheidt, Kerkrade (NL); Alexandru Hlibiciuc, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1517 days.

(21) Appl. No.: 11/573,836

(22) PCT Filed: Aug. 21, 2004

(86) PCT No.: PCT/EP2004/009375
§ 371 (c)(1),
(2), (4) Date: Sep. 11, 2007

(87) PCT Pub. No.: WO2006/021223
PCT Pub. Date: Mar. 2, 2006

(65) Prior Publication Data
US 2008/0052718 A1  Feb. 28, 2008

(51) Int. Cl.
*G06F 9/46* (2006.01)
*G06F 15/173* (2006.01)

(52) U.S. Cl.
USPC ........... 718/104; 718/105; 709/223; 709/224; 709/225; 709/226

(58) Field of Classification Search
None
See application file for complete search history.

(56) References Cited

U.S. PATENT DOCUMENTS

| | | | |
|---|---|---|---|
| 6,421,722 B1 * | 7/2002 | Bauer et al. | 709/224 |
| 7,257,640 B1 * | 8/2007 | Callocchia et al. | 709/233 |
| 7,324,551 B1 * | 1/2008 | Stammers | 370/468 |
| 7,353,538 B2 * | 4/2008 | Sample | 726/23 |
| 7,370,013 B1 * | 5/2008 | Aziz et al. | 705/40 |
| 7,421,499 B1 * | 9/2008 | Lanahan et al. | 709/226 |
| 7,444,411 B2 * | 10/2008 | Sung et al. | 709/229 |
| 7,526,547 B2 * | 4/2009 | Rodrigo | 709/225 |
| 7,656,879 B2 * | 2/2010 | Riedel et al. | 370/395.21 |
| 2001/0024452 A1 * | 9/2001 | Liu et al. | 370/468 |
| 2002/0082856 A1 * | 6/2002 | Gray et al. | 705/1 |
| 2002/0194251 A1 * | 12/2002 | Richter et al. | 709/105 |
| 2003/0074286 A1 * | 4/2003 | Rodrigo | 705/32 |
| 2003/0110171 A1 * | 6/2003 | Ozer et al. | 707/10 |
| 2003/0128676 A1 | 7/2003 | Lee | |
| 2004/0010592 A1 * | 1/2004 | Carver et al. | 709/226 |
| 2004/0062262 A1 * | 4/2004 | Venteicher et al. | 370/431 |
| 2004/0172464 A1 * | 9/2004 | Nag | 709/223 |

FOREIGN PATENT DOCUMENTS

WO  WO 03/061221 A  7/2003
WO  WO 2004/036843 A  4/2004

\* cited by examiner

*Primary Examiner* — Emerson Puente
*Assistant Examiner* — Adam Lee (57) ABSTRACT

The invention relates to a method, device and system for management of resource in a communication network having a resource owner (RO) providing the resource and at least one resource user (RU) using the resource. According to the present invention a resource broker is introduced between the resource owner and the at least one resource user. Said broker is arranged to perform a management procedure for deciding whether to perform a allocation, keeping or release of resource. In order to take a decision a resource usage measure (TTL) is used. In accordance with the present invention said measure is updated when user's usage measure (Keep Alive, InterestMsg) informing about the expected usage of the resource by a resource user is obtained. The update is performed by means of a cumulative algorithm taking into account current and past values of the resource usage measure (TTL).

25 Claims, 7 Drawing Sheets

RESOURCE MANAGEMENT

TECHNICAL FIELD OF THE INVENTION

The present invention relates to method, device and system for management of resources for telecommunications networks. The management comprises allocation, release or keeping of the resource.

Telecommunications networks, such as the third-generation wireless networks (UMTS Universal Mobile Telecommunication System) or high-speed networks such as asynchronous transfer mode networks aim to provide services such as voice, data, and multimedia via computing devices over network infrastructures. To support various services with a certain quality of service (QoS) requirement, resource provisioning is a major issue. In each case, the communications networks include at least one resource, which is to be managed in an appropriate way.

A number of applications in the current telecommunication systems are one-to-many applications, where one or a few sources are sending to many receivers. An efficient way to support this type of transmission is to use multicasting. Multicasting is an internetwork service that permits sources to send a single copy of a data packet to an address that causes the data packet to be delivered to multiple receivers. Under multicasting only one copy of a message will pass over any link in the network and copies of data packets will be done only where paths diverge. Furthermore, there is performance improvement for the sender if it is sufficient to send only one copy of a message, even if the message is going to a huge number of recipients. In case of the multicast transmission, the network connections are reserved for a number of users and also the server is accessed by a number of users so that its resources are to be distributed amongst the users, meaning that resource's provisioning considers the number of users sharing the resources.

The number of clients using a resource can vary and vanish in certain point of time. In case the resource is not used for a long period of time it may be released or destroyed. This kind of resource may be a server function temporarily allocated to a certain node of the network, an anycast, broadcast or multicast "association" e.g. used for transport purposes, a signaling relation between nodes and alike. The problem of shared resources occur not only for transport issue, but it may also apply for processing, storage capacity etc.

Figure 7:
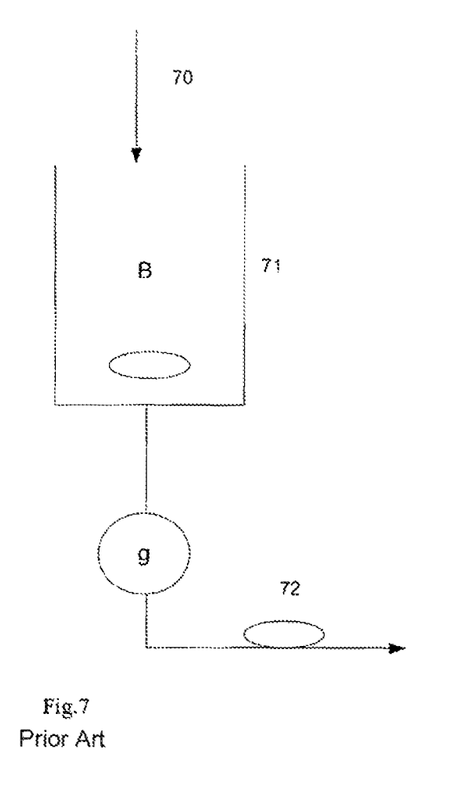
FIG. 7 shows a schematic representation of call admission according to state of the art using leaky bucket schema.

As mentioned above provisioning of resources, in particular of shared resources is one of the major issues in a network and call admission control is one of the provisioning strategies to limit the number of call connections in the networks in order to reduce the network congestion and call dropping. One call admission model is used for traffic shaping, which is for example applied for determination if a data flow should be allowed to send. The simplest traffic shaping schemas try to shape all traffic into isochronous flows with regular amounts of data being emitted at regular intervals. An example of the simplest traffic shaping schemas is the simple Leaky Bucket. FIG. 7 illustrates the leaky bucket schema. Incoming data flow in form of data packets 70 is placed into bucket 71. The data packets drain out the bottom of the bucket 72 and are sent on the network at rate g. The bucket size, B, limits how much data may be in the bucket waiting for input into the network. If the data flow carries more data than the bucket can store, the excess data is discarded. Typically, each data flow has its own leaky bucket. Conceptually, each host is connected to the network by an interface containing a leaky bucket, that is, a finite internal queue.

Once the resources are established, call admission algorithms are used to control the usage of reserved resources. Another aspect is the release of the allocated resources.

Besides multicast there are a number of further examples for which the problem of resources management occurs, like for example broadcast or anycast as a transmission means. Furthermore said problem occurs also in point-to-point communication, wherein a number of point-to-point connections build a virtual pipe or tunnel within a network, which is to be shared. Moreover the resources management problem occurs also by any associations issues, for example in case of SCTP stream control transmission protocol established between a client and its server. Herein the SCTP association between a server and a client is the resource, which in fact comprises memory and processing capacity in both the client and the server, and network capacity used for maintaining the association, wherein there is the necessity for an appropriate resource management.

It should be noted that a resource is in a "soft state" if its reservation expires or is destroyed by a server or by an entity responsible for resource management, after not being used for a certain period of time. Otherwise it is called a "hard-state" resource.

The cost of keeping an idle resource frequently is higher than the cost of releasing or destroying it and after an idle period seizing or creating it again on a need basis. Another key reason for keeping idle resources is to avoid long resource setup times when the resource is needed.

In the following an example is given for resource management in a point-to-point connection. In wireless networks, such as in packet switched GSM and WCDMA networks, a PDP-context is established. In the PDP context activation a mobile subscriber identity is associated with an IP address. During the PDP Context Activation a tunnel is created in the network. During this procedure also a Quality of Service QoS negotiation takes place between user's mobile station and the network. After the establishment of the PDP-context, said PDP-context is kept in order for the user to send or receive content instantly rather than first waiting until the PDP context is established.

For the aim of keeping resources active, different approaches for different protocols were developed, such as Keep Alive mechanism, Resource Refresh messages and alike are currently used by different network standards (H.323, RSVP, NSIS, etc.) for the purpose of keeping certain resources alive or in an active state. For example in the Keep Alive mechanism an instance (for example a server or a client) sends frequently a message or information included in a data packet (for example in a header) indicating that the connection is supposed to be kept open although currently no data is being sent. Thus, in case there is data for sending, the communication is carried out on the same already established connection. This is continued until either the server or the client decides that the communication is over, and one of them drops the connection.

Usually a Time To Live parameter is included in such messages, and controls live time of resources, so that a resource is not kept too long open unnecessarily. This technique was developed for a point-to-point connection, wherein one instance informs the other about its readiness for keeping the connection open. After a timer expires the connection is dropped.

Accordingly, existing technologies following the old practice when one resource was allocated to one user, are using time to live parameter to reset the timers defining the resource live time. That kind of approach hardly takes into account various preferences of multiple users within multicast connection or of the resource owner, and does not evaluate the proactive or expected usage of the resource, because the establishment and release of resources is currently based on either administrative routines or simple requests from resource users. These routines may be inaccurate and establish or release the resource too early or too late.

However, the problem does not only occur in the multicast transmission. In many cases existing technologies neither pose nor solve at all the problem of releasing idle resources, and leave it implementation-dependent.

SUMMARY AND DESCRIPTION OF THE INVENTION

It is an object of the present invention to provide a solution for efficient management of resources within a telecommunication network.

The method of the basic idea discloses a management procedure being implemented in a resource broker.

The method according to the present invention for management of resource for a communication network having a resource owner (RO) providing the resource and at least one resource user (RU) using the resource performs the following steps in the resource broker being introduced between the resource owner and the at least one resource user. In the first step a resource usage measure (TTL) is initiated. Said measure is used to track expected usage of a resource. The resource broker obtains user's usage measure (Keep Alive, InterestMsg) informing about the expected usage of the resource by a resource user. The user's usage measure can be either received as a message from a resource user or alternatively the resource broker calculates said measure based for example on reservation information or history information. In order to keep the resource usage measure (TTL) updated an update procedure for updating the resource usage measure (TTL) with the user's usage measure (Keep Alive, InterestMsg) by means of a cumulative algorithm taking into account current and past values of the resource usage measure (TTL) is performed. The common characteristic of the cumulative algorithm is cumulating of further values, in particular of the current resource usage measure and the history of said value in order to compensate the eventual uncertainty of the received user's usage measure indicating the expected usage of the resource by the resource user, which can be imprecise and have a certain degree of uncertainty. In this case the algorithm compensates the possible uncertainty or randomness of the information arriving from users, by means of averaging the usage measure over time and different users.

In accordance with the established resource usage measure a decision is made whether to perform a management action. For this purpose a checking procedure for checking the resource usage measure is performed. In case the resource usage measure justifies performing of a management action, which can be allocation, keeping or release of resource, a corresponding action is performed.

Since the cumulative algorithm considers the current and past values of the resource usage measure and additionally also the current and expected needs of resource users, it is possible to forecast the usage of the resource, so that the resource would not be kept open in case it is not needed and closed even when users use said resource. Currently such decisions are being made due to the statically set resource usage measure.

A resource broker is disclosed. The resource broker is arranged to perform management of resource for a communication network having a resource owner (RO) providing the resource and at least one resource user (RU) using the resource. Said resource broker (RB) is placed between the resource owner and the at least one resource user and comprises an initiation means for initiation a shared resource usage measure (TTL). Further the resource broker comprises an obtaining controller for obtaining user's usage measure (Keep Alive, InterestMsg) informing about the expected usage of the shared resource by a resource user. An update controller is introduced for updating the shared resource usage measure (TTL) with the user's usage measure (Keep Alive, InterestMsg) by means of a cumulative algorithm taking into account current and past values of the resource usage measure (TTL). For the purpose of checking the resource usage measure indicating the necessity to perform a resource management action a checking monitor is used. In accordance with the result of the checking monitor a resource management action means is adapted for performing resource management action. The mentioned means being part of the resource broker are arranged to perform the function as described in respect to the corresponding method step.

It is proposed that the resource broker has further features. For example the resource owner provides unreliable resources for brokering, then the resource broker may work as a kind of owner of a resource pool, which manages resources and provides for their redundancy in case of failures.

Furthermore the present invention discloses a system for management of a resource for a communication network having a resource owner (RO) providing the resource and at least one resource user (RU) using the resource. Said system comprises a resource broker (RB) as described above, a first communication interface between said resource broker (RB) and the resource owner (RO) and a second communication interface between said resource broker (RB) and the at least one resource user (RU).

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which

Figure 1:
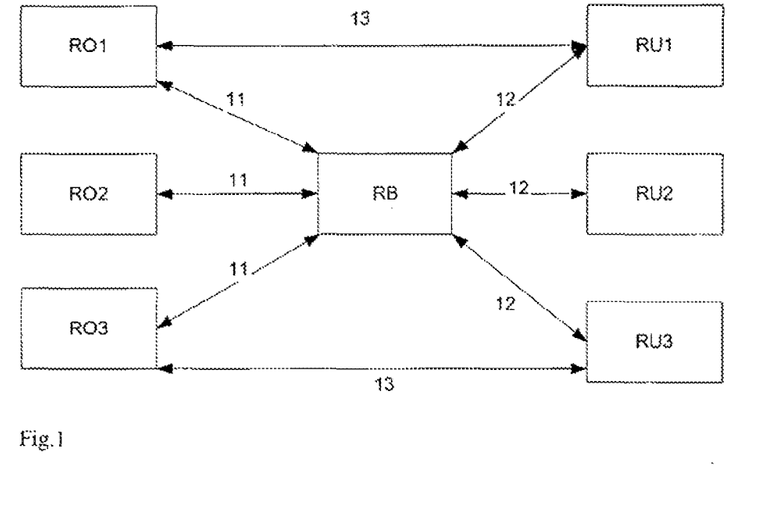
FIG. 1 shows a schematic representation of network architecture according to an embodiment of the present invention.

FIG. 1 shows a schematic representation of communication network architecture according to an embodiment of the present invention, where a new functional node, namely resource broker, RB, is introduced on communication link between at least one resource owner, RO, and at least one resource user, RU.

It should be noted that the terms "resource owner", "resource user", "resource broker", or generally "node", "means" in the context of the present invention refers to any suitable combination of hardware and software for providing a predetermined functionality in the communication network. In this way, said terms generally refers to a logical entity that can be spread out over several physical nodes of the network, but can also refer to a physical entity located in one physical node.

In the examples described thereafter the function of a resource broker is performed by servers or content providers, wherein a server can be responsible for communication links in a network and content provider provides content which is to be distributed to the users.

Preferably, the communication network is a mobile communication network, e.g. is a mobile communication network operating according to GPRS (General Packet Switched Radio) or UMTS(Universal Mobile Telephone System) or GSM. However, the present invention is also applicable in any communication network providing resource.

It should be noted that the term "resource" designates any kind of resource entity. In the present invention two kinds of resource sharing is disclosed; simultaneous sharing, which means that multiple resource users access a resource at the same time) and sequential sharing, which means to have one resource user accessing a resource at the same time.

In the following, embodiments are presented showing simultaneously shared resource. Preferably, examples of said resources are network resources that could be virtual entities in a communication network and seized or created for the common use of distributed users. Thereby, these might be the network connections being for example used for multicast/broadcast transmissions but also resources at certain network nodes, like for example processing time, or storage can be considered as shared resources according to the present invention. However the present invention is not restricted to simultaneously shared resource. In fact the proposed method can be used for resource management in case of a single user of a resource. For instance the method can be used for release of any transmissions/connection associations, for example in case of SCTP stream control transmission protocol established between a client and its server. As aforementioned, the SCTP association between a server and a client is the resource, which in fact comprises memory and processing capacity in both the client and the server, and network capacity used for maintaining the association. In this case the server is a resource owner and the client is a resource user and the procedure according to the present invention can be performed in order to decide whether said association is to be maintained, this procedure can be performed either by the client or by the server or independently by both the client and the server. This control might be useful for an operator in order to save the cost of resource association in a node. In the following two embodiments are presented showing the applicability of the present invention for management of shared resources. However, the same procedure applies also for a resource being not shared.

It can be that the resource is a distributed entity and different nodes own/host different parts of the resource entity. Then it is reasonable to assign/ designate the resource owner function to several or all of the nodes sharing the ownership of the resource. In this case the logic of a resource owner and of a resource broker can be collocated in one node. Even more each node sharing the resource ownership can have its own resource broker logic. The node/logical entity that owns most expensive part of a distributed resource or has characteristics limits which in case of an overload may impact system/ service availability can have a more restrictive resource management procedures, so that in majority of cases this node makes decisions on whether to reserve, keep, or release the resource. In this case each RO can play its own RB role as well.

Returning to FIG. 1, it can be seen that in a network architecture more than one resource owner can be placed. As mentioned above, there can be different kind of resources available and each resource owner owns at least one kind of said resource. Also, it is possible that one kind of resource can be managed by each of the resource owner. However, one resource, which is to be managed, has its own management procedure at a resource broker. Alternatively, each resource broker can be responsible for one resource.

According to FIG. 1 there is an interface, 11, between the resource owners, RO, and the resource broker, RB, for indicating the availability of the resource to the resource broker. Further there is an other interface, 12, between the resource broker and the resource users for communicating with the users. Said interface is used for informing the resource broker about the user's readiness for usage of resource. Hence, the users can inform the resource broker by means of this interface, 12, whether they want to request a resource reservation, keep the resource reserved or whether they want to release the resource. Furthermore this interface can be used for further communication purposes as this is described in accordance with further embodiments of the present invention.

Preferably, the real data traffic does not need go via the resource broker. For example in case shared resource is communication link then the transmission goes over said link without involving the resource broker into the communication. The independence of resource usage from the management procedure of the resource is depicted in FIG. 1 by means of a direct interface, 13, between resource owner and resource users.

Alternatively, the real data traffic goes via the resource broker. For example in case the resource broker RB is a logical part of the resource owning node. In that case the resource usage traverses the resource broker, which may control if the resource usage is according to what was indicated or requested. Furthermore the resource broker may use the resource usage for charging or statistical purposes.

Figure 2:
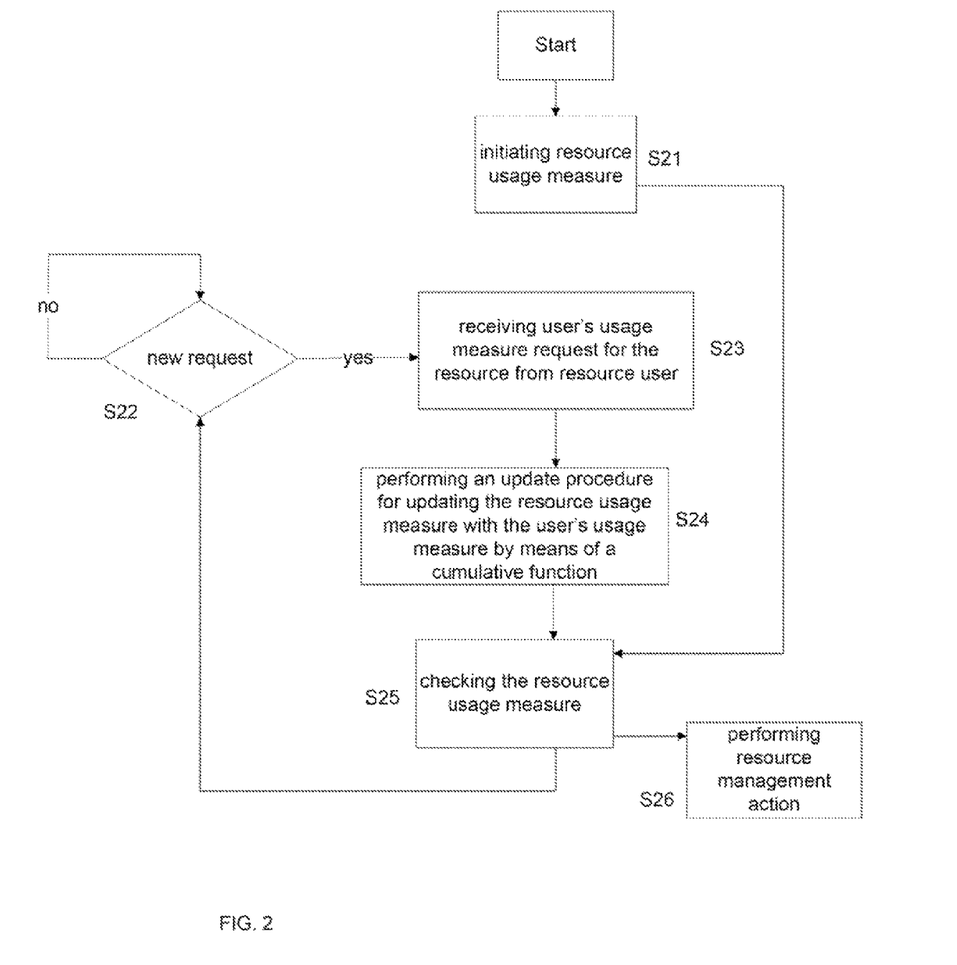
FIG. 2 shows a flowchart of a basic embodiment of the present invention.

FIG. 2 shows a flow chart of a basic embodiment of the method of the present invention with steps being carried out in the resource broker. The following steps are to be performed for management of a resource. Preferably, a resource broker manages a number of resources and thus a number of management procedures according to FIG. 2 is to be performed in a resource broker. Alternatively, the management procedure could be run for each user separately and later on an algorithm harmonizing the multitude of the running procedures is to be carried out in order to reduce it to a single value (like a single TTL timer).

According to the method for resource's management shown in FIG. 2, said method being carried out in the resource broker comprises step S21, where a resource usage measure is initiated. The initiation of the resource usage measure can be performed in any desirable or suitable way. For example, the resource broker can initiate it with a value, which the resource broker determines by itself. Alternatively, the resource owner can provide the value to the resource broker. For example the resource owner defines costs or time interval for the resources, which are sent to the resource broker for estimation the initiating usage measure. The usage measure could be for instance Time To Use or money to spend in a certain period of time that is the combination (money, time interval). Furthermore, the resource owner can provide additional information, like for example resource costs which can be used to influence the result of the update procedure.

Moreover the initiation phase can include the provision of associations between a resource and the information related with said resource. The association can be performed in any desirable and suitable way. For example resource broker can generate a local entry (for example resource item representation) when the resource owner grants permission to the resource broker for brokering a resource entity. Alternatively, this step can also be done via administration routines. The initiation procedure results in the defined association, including for example model type of the update procedure, its parameters and their initial values, for instance model="leaky bucket", measure-type="average amount of money earned by resource owner in a specified period of time per seized resource", the amount is specified by Reason-to-Live="the actual amount of money sufficient for seizure of a resource entity" that latter switches the resource on.

Additionally, also other parameters can be initialised, for instance the resource usage measure is set to a value defining time for keeping the resource open.

Subsequent to step S21, the method of FIG. 1 proceeds to step S25, wherein checking the resource usage measure is performed. Hereby this step can be performed in any preferable way, depending on the demands. For example it can include means for changing the resource usage measure in order to have a variable value allowing taking a decision. The connection between S21 and S25 allows detection of users' interest. Thus, in case no user's usage measure arrives, the procedure terminates via S25 in step S26, in which a corresponding resource management action is performed.

In parallel the step S22 is conducted until a request from a user is received, which means the procedure waits for an event of receiving a request informing about the interest of the users regarding the usage of the resource. The users are able to provide for example periodically a consistent estimation of their expected usage of the resource by means of the user's usage measure or a list of parameters, which facilitate the computation of the measure in resource broker. Further example can be that this information is provided with different intervals. Said measure may be implemented as a kind of Keep Alive message, which is used in the following embodiment. However, there are different ways for implementation of the user's usage measure besides sending a request message. Some examples are given further in respect to FIG. 4.

Alternatively to sending a message including the user's usage measure from the resource users to the resource broker, the resource broker can calculate the user's usage measure by itself. The calculation can be for example based on a model type, history information and already received updates for the resource.

It is to be noted that there can be a number of users accessing a shared resource, meaning that requests arrive from different users, usually at different and changing points in time. Also it should be that the information itself or the information values may differ over time and/or per user. Therefore it is proposed to have some kind of recognition procedure in order to put the accessing resource user into relation with the running management procedure.

In on embodiment of the present invention it is proposed to have the following solution. The resource user sends a request for a resource to the resource broker and indicates a certain type of resource and possibly a time interval for reserving the resource. When the resource broker reserves a resource entity for the resource user, the resource broker sends an ACCEPT message with the identity ID of the reserved resource entity or association ID. Later on if the resource user wants to update the corresponding resource at the resource broker on the expected resource usage the subsequent KeepAlive message refers to the valid entity ID.

When a user's usage measure request for the resource arrives, S23, the method proceeds to step S24, wherein an updating procedure for updating the resource usage measure with the user's usage measure by means of a cumulative algorithm is performed.

It should be noted that the term "cumulative algorithm" in the context of the present invention refers to any suitable method for performing a calculation of a new resource value taking into account further parameters, like current and past values of the resource usage measure (TTL) and the user's usage measure (KeepAlive). As an example in the following description an approach based on Leaky Bucket method is described. The Leaky Bucket is an algorithm currently used for System Load Control and Call Admission purposes as it is already described in the background part of the present invention. An other algorithm being applicable for the cumulative method is the so-called CUSUM algorithm. This is a statistical algorithm used in Statistical Quality Control for the purpose of detecting a change in behavior of stochastic processes. There are a number of other algorithms used for similar purposes, for instance Moving Average. Algorithms similar to moving average are used for flow control purposes in Internet transport protocols. However, these are merely examples and the present invention should not be restricted to any of these examples. More information about statistical algorithm are to be found in Basseville Michèle, Nikiforov Igor, Detection of Abrupt Changes: Theory and Application, Prentice-Hall, Inc., 1993 and in Carlstein E., Muller H.-G., Sigmund D. (ed.). Change-Point Problems. Institute of Math. Statist. Lecture Notes Monograph ser., V. 23, 1994;

It shall be noted that the values as such are not necessarily scalar, they can belong to any suitable value space, it can be discrete or continuous as well as multidimensional or of any other nature. Of course additional adaptation is needed for example in order to run timers.

Furthermore it is to be noted that the type of the cumulative algorithm to be used is usually determined at step S21, when initialisation of the whole procedure is performed. That is at step S21 the decision is taken on which algorithm to use. However an on line algorithm which adapts itself to the incoming data stream of user's usage measure (KeepAlive) can be of use. In this case new user's usage measure can trigger a change of the algorithm as such. If the selected type of the algorithm depends on a number of parameters, said parameters can be either provided on demand, or estimated based on any statistics/history. These parameters can be determined using the Least Square Fitting method, that allows finding the best fitting parameters values to a given statistical data set/accumulated history, or any other appropriate method. The algorithm might be an autoregressive statistical algorithm as well.

Furthermore it is to be noted that the cumulative algorithm might be an autoregressive algorithm, which means that according to given parameters a decision is made, which algorithm is to be applied. Said parameters can be either provided on demand, or estimated based on any statistics/history.

Returning to FIG. 2, in subsequent step S25 it is tracked whether the new updated resource usage measure justifies an action changing the status of the resource. The status of the resource can be either the resource is to be released, reserved or kept. Moreover this can be the reservation of an idle resource or the extension of the reservation of a reserved resource. The purpose of the checking procedure is to check, whether any action condition is met in order to perform a resource management action. The checking might be performed in any suitable and desirable way. For example it might be performed by means of a comparison function, comparing the resource usage measure with any suitable action condition. For example whether the resource usage measure meets the action condition can be established from values of domains/sets. The resource usage measure can have a form of a single scalar value or a vector. For example in the space of possible values of resource usage measure three domains can be defined: domain $D_1$ "release", domain $D_2$ "reserve", domain $D_3$ "keep reservation", wherein $D_2$ is part of $D_3$ and the action value can take three values "release", "reserve/allocate" and "keep/extend allocation", which could be determined using $D_1$, $D_2$, $D_3$. In principle these domains could be rather sophisticated, and methods of computational geometry (as for example described in Franco P. Preparata, Michael I. Shamos, Computational Geometry : An Introduction, Springer-Verlag, 1993) can be used to verify to which domain the new value belongs, and which action shall be taken. Preferably the resource usage measure value is transformed to a positive scalar and a TTL timer is started. Anyhow these are merely examples for the checking procedure used to decide about a resource management action.

Since in case the comparison's result states that the resource usage measure justifies a change, then an action is started changing the status of the resource, S26, e.g. by deciding to release or to reserve or to extend the reservation of the corresponding resource. Otherwise, when the result of the comparison is that the action value is not reached, the method proceeds to step S22, in which a new user's usage request is awaited.

Figure 3:
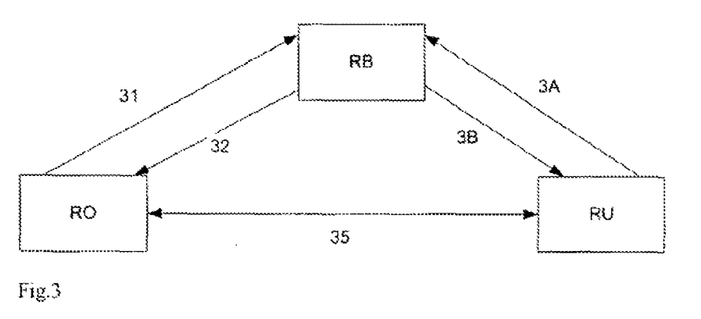
FIG. 3 shows a schematic representation of signalling according to an embodiment of the present invention.

In the following schematic signalling exchange between resource owner, resource user and resource broker according to FIG. 3 is described. In the first step, 31, the resource owner offers a resource, for example by sending an OFFER message to the resource broker. Preferably, said message can carry an amount of parameters, such as Resource Type, Resource Identity, Availability Pattern or Keep Alive Flag, defining the availability of the resource or informing about any planned down time and time thereof or informing about the variation in time of the resource usage or informing about resource redundancy. Subsequent, the resource broker decides about its interest for management of the offered resource. The decision is sent in the subsequent step 32 to the resource owner by means of ACCEPT/REJECT MESSAGE informing about the met decision.

In respect to FIG. 3 there is an interface between resource broker and resource user. The resource user informs for example by means of REQUEST (ResType, Usage Pattern) message, 3A, about its interest for the usage of the offered resource. As a reaction to the received request from the resource user, the resource broker validates the request and sends either accept or reject message to the user, 3B. The usage of the resource is performed independent from the resource broker and directly between the resource owner and resource users, 35. The ACCEPT message contains resource descriptor, resource ID, etc. In fact the ACCEPT message can contain the time when according to the RB the resource can/will be seized for a common usage by a number of resource users, for instance said message can contain the starting time of a multicast session, which is estimated based on the resource users interest.

Figure 4:
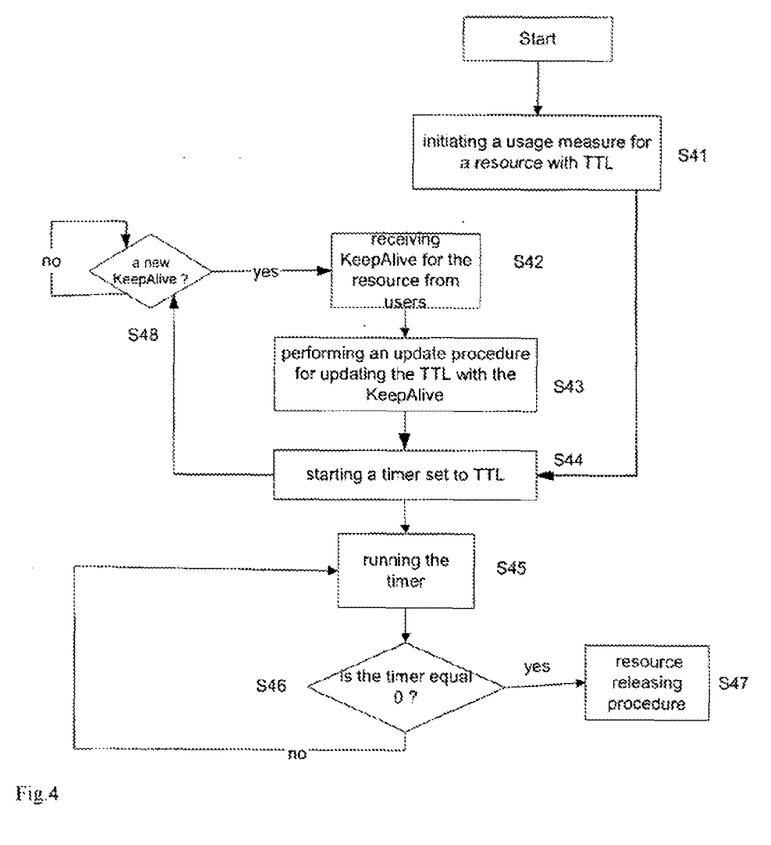
FIG. 4 shows a flowchart of an embodiment of the present invention for releasing shared resource.

In the following an embodiment of the present invention is presented according to FIG. 4 showing a flowchart of an embodiment of the present invention for releasing a shared resource. The following steps are to be performed in order to decide about the release of a shared resource. The following embodiment is based on some examples for the measure parameters. However these examples should not be seen as a restriction for carrying out the present invention. In step S41, a TimeToLive TTL being an example for a resource usage measure is initiated. As already mentioned, the initiation of the resource usage measure can be performed in any desirable or suitable way. As also already mentioned in respect to FIG. 2 the usage measure could be for example Time To Use or money to spend in a certain period of time that is the combination (money, time interval). Alternatively the resource broker can adjust the Time To Live (TTL) timer of the resource on the basis of the received messages, events or delivered services, or historical knowledge. For instance in case of broadcast, multicast or anycast the TTL could be increased by a default value whenever content is distributed to the group.

Subsequent to step S41, the method of FIG. 4 proceeds to step S44, in which a counter initiated with the TTL is started. The implementation of said counter can be performed in any desirable or suitable way, for example it may be just a counter without a relation to time, or it may have a relation to something else, such as processing capacity, cost of the resource or similar. IN the following we use a timer as an example for a counter, however this should not be seen as any restriction for the present invention.

The purpose of said timer is to indicate time for keeping a resource reserved. In the subsequent step S45 the running down of the timer is shown, whereby the running down is conveyed upon the timer achieved the value 0, S46. In this case the resource is released, S47. In the presented embodiment, the steps S44, S45 and S46 build the general step of checking the usage measure, as indicated in FIG. 2 in step S25. However, the running down timer is stopped by an incoming update message from resource user, so that the current TTL equals the time left to timer's expiration. If there are no update messages from resource users up to the timer expiration the TTL is set to zero, when the timer expires. The just mentioned flow describes a case, when a usage measure is initiated and no user's usage measure message indicating the user's interest arrives. Herein the procedure goes via S44, S45, S46 and ends in S47 with the release of the resource, since no user seems to be interested in having the resource reserved.

In the following the second part of FIG. 4 is presented, in which a Keep Alive message arrives, in step S42. According to the present invention the users are able to provide periodically a consistent estimation of their expected usage of the resource. Alternatively, this might be released administratively/manually, for example the resource broker estimates the required reservation time based on the number of requests per time period. Said estimation is sent to the resource broker by means of the user's usage measure. Said measure may be implemented as Keep Alive message according to the embodiment of FIG. 4. Users send KeepAlive messages to the resource owner in the service request messages and periodically re-send it in appropriate messages before their KeepAlive information expires. However, it is not really necessary to periodically send a Keep Alive message. It is also possible that KeepAlive messages are not sent periodically, but rather when the resource is actually required. The resource broker can request periodic KeepAlive updates from the resource user in the ACCEPT message when a resource is reserved. It should be further noted that KeepAlive information can also be denoted by the reception of content to be distributed, without any dedicated KeepAlive indicators. The value of user's usage measure can have different values in different KeepAlive messages sent from a resource user to its resource broker.

When KeepAlive arrives, S42, the method proceeds to step S43, wherein an updating procedure for updating TTL with the received KeepAlive by means of a cumulative algorithm is performed.

In the following an embodiment for the calculation of the new TTL by means of a cumulative algorithm based on the Leaky Bucket approach is described.

As already mentioned the cumulative algorithm considers the past value of the resource usage measure and additionally the current needs of the users. Thus, in this example a Total_KeepAlive value is updated by means of a Model Function, fct, in that $$Total\_KeepAlive(n+1)=fct(Total\_KeepAlive(n), KeepAlive, \ldots)$$

wherein in respect to the Leaky Bucket approach the above formula has the following form $$Total\_KeepAlive(n+1)=MIN(Total\_KeepAlive(n)-\Delta TTL+KeepAlive*weight, MAX\_Total)$$

wherein

Total_KeepAlive(n) describes the current resource usage measure cumulating its past values;

$\Delta TTL$ is the time expired after the last TTL update;

weight may depend on the user's identity or category considering some kind of prioritisation;

MAX_Total defines the total capacity of a Leaky Bucket.

The new estimated Total_KeepAlive(n+1) value is used to determine a new TTL, wherein $$TTL=Total\_KeepAlive(n+1)-ReasonToLive$$

The ReasonToLive value influences the time point of resource release. Consequently, the higher the ReasonToLive value the faster a decision to release the resource is made.

As in FIG. 4 indicated in step S44, the timer, which was initially set to TTL is updated with the new calculated TTL and said timer starts to run.

Figure 8:
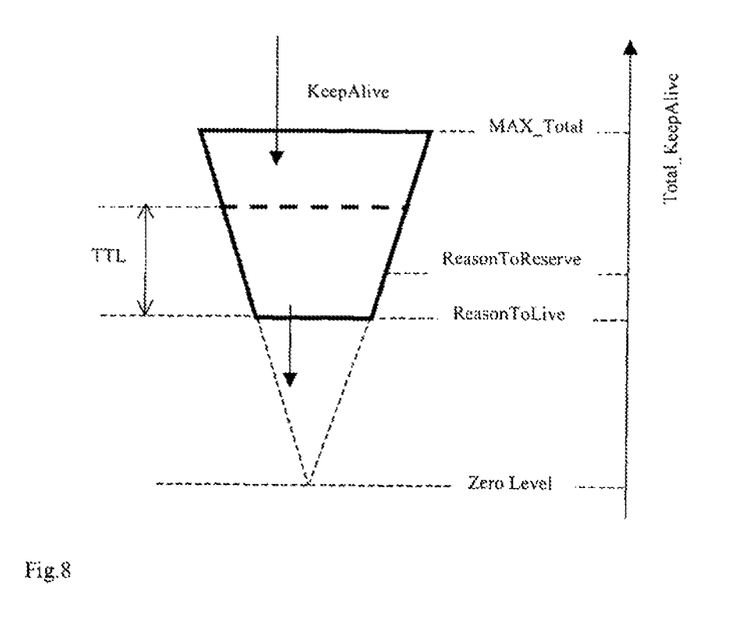
FIG. 8 shows a schematic representation of an embodiment of the present invention for releasing resource using leaky bucket schema.

In the following, in order to explain the above introduced parameters with regard to Leaky Bucket, an embodiment for the calculation of the TTL in respect to FIG. 8 is given.

FIG. 8 shows a schematic representation of the Leaky Bucket algorithm. The Leaky Bucket has an upper value, which is the MAX_Total indicating the maximal value that can be assigned to Total_KeepAlive.

It is to be noted, that there might be further parameters controlling the Leaky Bucket, for example a maximal number of incoming KeepAlive messages per given time interval might be introduced in order to provide overload protection in resource broker.

The bottom of said Bucket builds the ReasonToLive value, which shows when a resource being administrated by means of this bucket can be released. The upper arrow coming into the bucket indicates the incoming KeepAlive messages. The outgoing arrow indicates the dropping of the TTL timer.

As described above, the timer being set to TTL counts down. According to FIG. 8 said timer is updated to a higher value when a new KeepAlive message arrives, meaning that the fullness of the bucket increases. Otherwise when no new KeepAlive messages arrive, the timer achieves the zero level meaning that the resource is to be released.

It should be noted that the settings of configuration parameters, such as ReasonToLive, MAX_Total, weight, as well as selection of the Model_function depends on actual needs and could vary from case to case. In particular, it is to be emphasized that this function can consider further parameters, like for example resource costs, resource availability etc. Since the above-described steps of calculation are similar to the CUSUM algorithm the developed Statistical methods for building the CUSUM model all could be of use to determine the model parameters.

Furthermore, it should be noted that by selecting the model function one is able to adjust the algorithm for different use cases, for instance the algorithm can also consider whether there is one or multiple units that use the resource (e.g. multiple sources distributing content to a multicast group) and adapt the TTL accordingly. In case of multiple sources, the algorithm can calculate equal cost shares for the content providers, for instance in case of distribution of commercials where the content provider (and usually not the content receiver) pays. Providing a higher TTL implies a higher relative cost.

It should be also noted that the KeepAlive values are stored together with the content sender identifiers for charging purposes, so that an appropriate charging for the resource being used or kept open can be achieved. The invention also enables the charging of the time that a resource is reserved but not used by the resource users.

Figure 5:
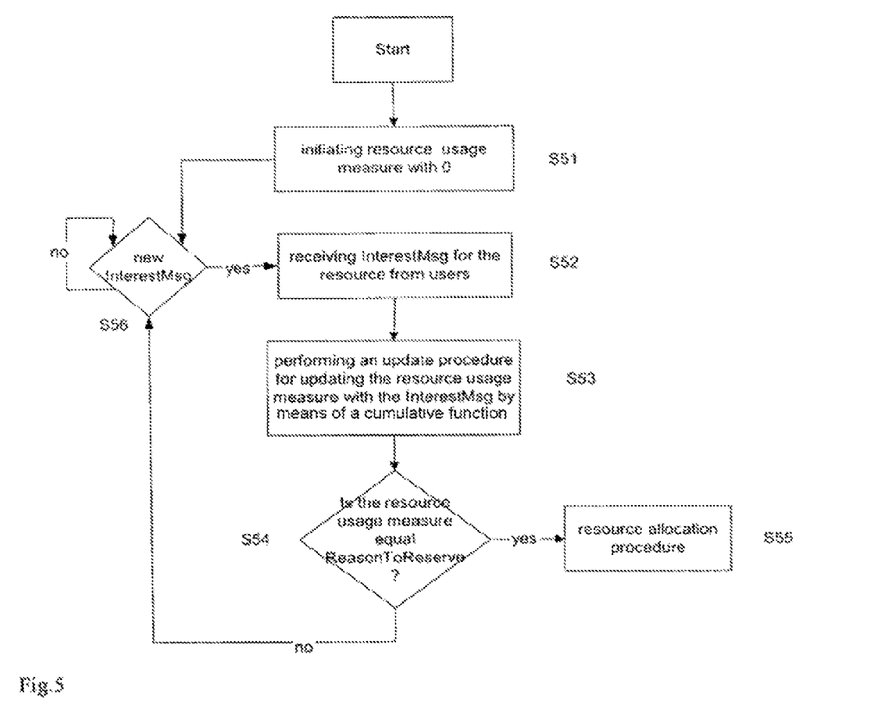
FIG. 5 shows a flowchart of an embodiment of the present invention for allocation of shared resource.

According to FIG. 8 there is also a ReasonToReserve value indicating a possible value for allocating a new resource, as it is described in an embodiment in respect to FIG. 5.

Returning to FIG. 4, it was said that the timer is set to the new updated TTL value and started to run, S43. The implementation of said timer can be performed in any desirable or suitable way. For example it can count down time units. The counting down can also consider the actual usage of the resource. For example the decrease of the counter can go faster when more bandwidth is used, this is achieved by scaling/weighing correctly the TTL prior to starting the timer. In subsequent step, S44, the running timer is shown. Said timer is checked periodically, whether it achieves a pre-determined value, step S45. In this embodiment the pre-determined value is set to 0. However, every experienced value might be applied. In case the timer has achieved a pre-determined value, then the resource is released. Otherwise the procedure returns to step S44, from which an arrow provides also to step, S47, in which a new KeepAlive message is awaited.

It should be noted that the resource release procedure can be implemented in different ways depending on the kind of the resources. For example if the resource is a memory at the server then a certain information is to be sent to said server informing about resource release.

In the following an embodiment of the present invention is presented according to FIG. 5 showing a flowchart of an embodiment of the present invention for performing resource allocation. The following steps are to be performed in order to make a corresponding decision.

In step S51 a resource usage measure is initiated with a pre-determined value, which is in this case 0. Subsequent to step S51, the method of FIG. 5 proceeds to step S56, which is conducted until a request from a user is received. Said request is expressed in this embodiment as InterestMsg indicating the interest of users for certain kind of resource. In order to be able to send the InterestMsg, the users are to be informed about the possibility for the allocation of this resource. This can be done for example by means of a broadcast message being sent from the resource owner to the potential users. However, there are a number of known methods for informing users about a new hardware or services, so that these are not described herein.

In the subsequent step, S53, the resource broker performs an update procedure for updating the resource usage measure with the InterestMsg by means of a cumulative function.

In the following embodiment of a cumulative function in a resource reservation model, Total Interest denotes the resource usage measure referring to the interest measure. In this example a Total_Interest value is updated by means of a Model Function, fct2, in that $$\text{Total\_Interest}(n+1) = fct2(\text{Total\_Interest}(n), \text{Interest-Msg}, \ldots)$$

The corresponding Model function might have the following form:

$$\text{Total\_Interest}(n+1) = \text{MIN}(\text{MAX}(\text{Total\_Interest}(n) - \Delta TTL, 0) + \text{InterestMsg} * \text{weight}, \text{MAX\_Total})$$

wherein

Total_Interest(n) describes the current resource interest measure;

$\Delta TTL$ is the time expired after the last Total_Interest update;

weight may depend on the user's identity or category considering some kind of prioritisation;

MAX_Total defines the total capacity of a Leaky Bucket and is the same as in the resource release model above.

It is to be noted, that for some resource reservation models there is no need to start timers, it depends on the Interest patterns provided by users in the InterestMsg. However in some cases the time passed after the last update shall be considered as it is pointed out in the above-mentioned example by including in the model the $\Delta TTL$ parameter.

Another example of the model function can be a moving average like function:

$$\text{Total\_Interest}(n+1) = T\_Weight(n) * \text{Total\_Interest}(n) + \text{weight} * \text{Interest}Msg$$

wherein

T_Weight(n) is the (smoothing) parameter that at each step adjusts the Total_Interest(n)

Users can send InterestMsg periodically or only once when the number of users is counted. However, this should not be seen as a restriction for the present invention. However, with the update procedure the cumulative interest for a specific resource is estimated. After each update said value is compared with a pre-defined ReasonToReserve value, S54. In case said value is achieved a procedure for allocation of a resource is started. Otherwise the procedure returns to the state, S56, in which a next InterestMsg is awaited.

Preferably, it is proposed to start the resource release method, when resource has been allocated according to the above described procedure. In this case the Total_KeepAlive (0) is initialised either by the current Total_Interest(n+1) value or by any other appropriate value, whereas the TTL is initialized with Total_KeepAlive(0)–ReasonToLive, or any other appropriate value.

Figure 6:
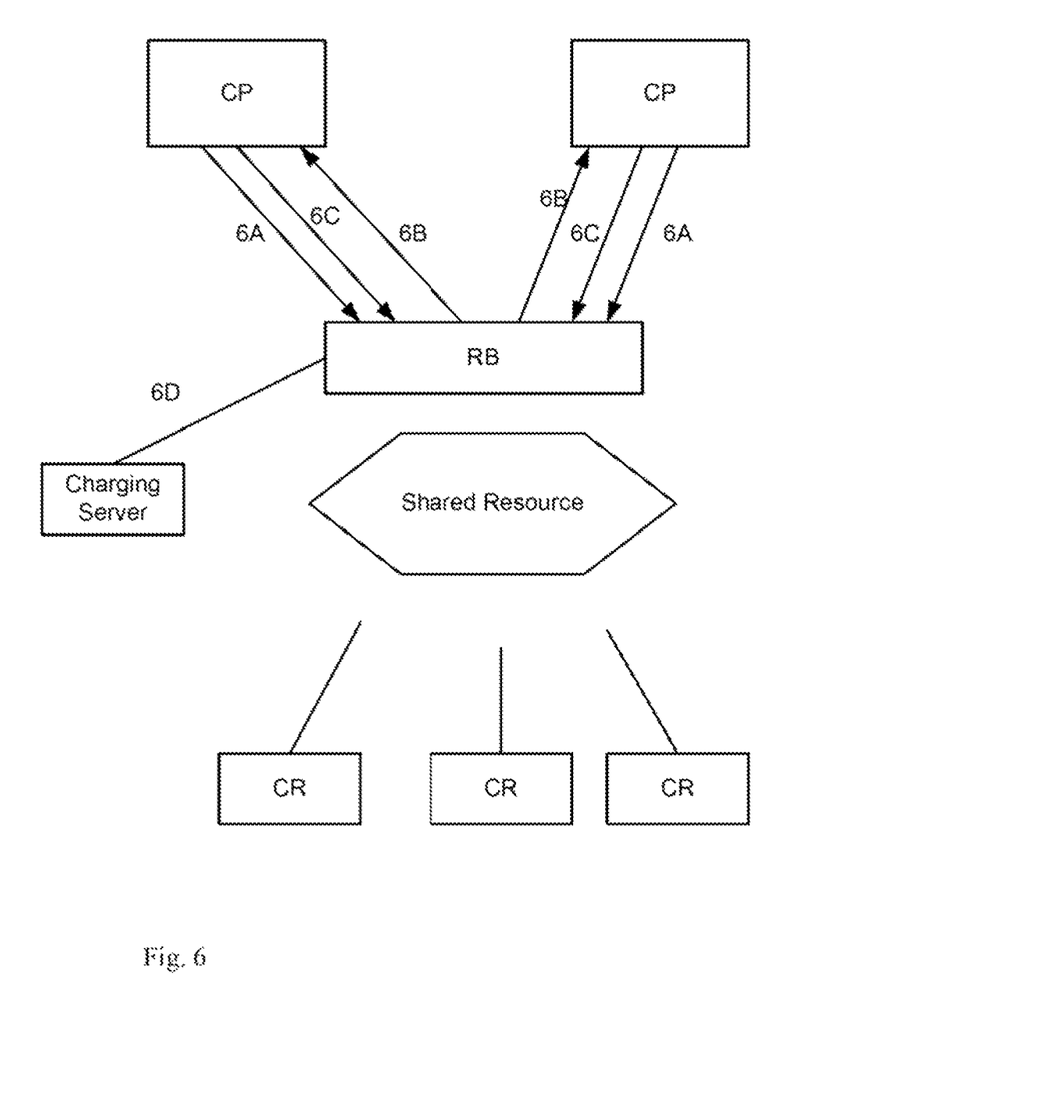
FIG. 6 shows a schematic representation of system architecture and interfaces according to an embodiment of the present invention.

In the following an embodiment of system architecture and interfaces according to the present invention in respect to FIG. 6 is presented. FIG. 6 shows a schematic representation of a system for broadcast or multicast content provision, in which content providers CP represent resource owners and the resource is the shared communication network distributing the content among a number of users being in this context content receivers CR. Further as already mentioned the shared resource can be also a multicast group. According to the present invention the resource broker hosts the leaky bucket algorithm for each resource to be managed. Between the content providers CP and content receivers CR there is the resource broker RB administrating the shared resources. Further in respect to FIG. 6 there are query interfaces between the resource broker and the content providers. By means of the logical connection 6C, content providers send the content to the resource broker.

In this embodiment the real resource usage goes via the resource broker, so that the said resource broker is able to control the traffic.

Preferably, the resource broker also provides query interfaces towards the content providers, 6B and 6A. Said interfaces are utilized for querying parameters needed for performing the procedure for managing resource. In the following some examples are given to illustrate which parameters can be exchanged between the communicating instances. For example over the 6A interface a request information about the availability of the resource, like for example whether the resource has already been established, might be queried. This query is typically used for non time critical content that is preferably distributed when the resource is already established by another content provider, for example at a reduced cost. Further in order to ensure an appropriate working update procedure, some additional parameters or more precise estimated parameters might be queried. In a particular embodiment, request information about the leaky bucket parameters, such as ReasonToLive, number of resource users, might be ordered. Furthermore the resource broker might require information about resource characteristics, like for example available bandwidth, QoS, costs for the reservation and/or actual usage of the resource at the moment (since the cost may depend on the number of simultaneous resource users) in order to set the parameters affecting the decision about reservation/allocation or release of resource in a better way. The management procedure for managing resources might need further parameters in order to set its parameters in a better way. For example the parameters of the update procedure might depend on the resource cost, which can influence the leaky bucket state.

Instead of having the content providers query the resource broker, the content providers may also be notified by the resource broker, preferably when they have registered for the corresponding information distribution. This communication can be performed by means of the 6B interface. For example the resource broker may send a message that someone just established a resource of type 'X' and there is still 'Y' amount of bandwidth available.

Preferably the resource usage information is stored and sent to charging servers, which can use this information to establish better cost distribution among the resource users (even for the time when the resource is just reserved but not actually used) of the resource. This kind of communication is denoted as 6D in FIG. 6.

However these are merely examples showing that by means of interfaces additional information might be queried to ensure a better performance of the resource management procedure according to the present invention.

The invention claimed is:

1. A method for management of a resource for a communication network having a resource owner, at least one resource user using the resource and a resource broker for managing the resource, the method comprising the resource broker performing the following steps:

initiating a resource usage measure for controlling a reservation of the resource;

obtaining a resource user's usage measure indicating the estimated usage of the resource by the at least one resource user;

performing an update procedure for updating the resource usage measure with the resource user's usage measure by executing a cumulative algorithm averaging current and past values of the resource usage measure over time and the resource user's usage measure over the at least one resource user, wherein the cumulative algorithm is chosen from a plurality of cumulative algorithms based on the resource user's usage measure;

performing a checking procedure for comparing the updated resource usage measure with a pre-determined value indicating the necessity to perform a resource management action; and performing the resource management action according to the result of the checking procedure.

2. The method according to claim 1, wherein the resource is embodied as a sequentially shared resource, wherein only one resource user accesses the resource at the same time or the resource is embodied as a simultaneously shared resource, wherein multiple resource user's may access the resource at the same time.

3. The method according to claim 1, wherein the resource usage measure is initiated with a value being estimated from at least one parameter received from the resource owner.

4. The method according to claim 1 wherein the resource usage measure is initiated with a value being determined at the resource broker.

5. The method according to claim 1, wherein the step of initiating the resource usage measure controlling a reservation of the resource includes providing an association between the resource and information related to said resource.

6. The method according to claim 1, wherein the resource usage measure is set to a value defining time for keeping the resource open.

7. The method according to claim 1, wherein the resource user's usage measure is being received periodically from the at least one resource user.

8. The method according to claim 7, wherein the resource user's usage measure is being received from the at least one resource user on demand depending on the resource user's needs.

9. The method according to claim 1, wherein the resource user's usage measure is calculated in the resource broker.

10. The method according to claim 1, wherein a recognition procedure is performed in the resource broker in order to recognize a relation between the at least one resource user and the corresponding resource, its owner and the management procedure, wherein the relation is based on a previously assigned identity.

11. The method according to claim 1, wherein a Leaky Bucket algorithm or a CUSUM algorithm is used as cumulative algorithm.

12. The method according to claim 1, wherein the resource management action is allocating of the resource, keeping of the resource or release of the resource.

13. The method according to claim 1, wherein the checking procedure is performed by comparing the resource usage measure with an action condition.

14. The method according to claim 1, wherein said method uses additional information received over a first interface placed between a resource broker and resource owner.

15. The method according to claim 1, wherein a timer is set to the resource usage measure and said timer is started to count down time, wherein said timer is checked for necessity to perform release of the resource.

16. The method according to claim 1, wherein the resource measure indicates interest of the at least one resource user to perform allocation of the resource.

17. The method according to claim 1, wherein an additional interface is introduced to exchange information with a charging entity wherein the resource broker provides the resource usage measure to the charging entity for charging.

18. The method according to claim 17, wherein for the charging, time is estimated where the resource has been reserved but not used.

19. The method according to claim 17, wherein the charging information about a number of multiple resource user's sharing a resource is estimated.

20. The method according to claim 1, wherein a real resource traffic is transferred via said resource broker.

21. A resource broker adapted to perform management of a resource for a communication network having a resource owner providing the resource, and at least one resource user using the resource, said resource broker comprising:

a processor and memory;

initiation means for initiation of a resource usage measure controlling a reservation of the resource;

an obtaining controller for obtaining a resource user's usage measure indicating the estimated usage of the resource by the at least one resource user;

an update controller for updating the resource usage measure with the resource user's usage measure by executing a cumulative algorithm averaging current and past values of the resource usage measure over time and the resource user's usage measure over the at least one resource user, wherein the cumulative algorithm is chosen from a plurality of cumulative algorithms based on the resource user's usage measure;

a checking monitor for comparing the updated resource usage measure with a pre-determined value indicating the necessity to perform a resource management action; and resource management action means for performing resource management action according to the result of the checking monitor.

22. The resource broker according to claim 21, wherein said resource broker has a first communication means for interaction with a first communication interface being placed between said broker and the resource owner and a second communication means for interaction with a second communication interface being placed between said broker and the at least one resource user.

23. The resource broker according to claim 21, wherein said resource broker has a third communication means for interaction with a third communication interface being placed between said broker and a charging unit.

24. A system for management of resource for a communication network having a resource owner providing the resource, and at least one resource user using the resource, said system comprising:

a resource broker having a processor and memory between the resource owner and the at least one resource user;

a first communication interface between said resource broker and the resource owner and a second communication interface between said resource broker and the at least one resource user, wherein the resource broker is adapted for:

initiating a resource usage measure for controlling a reservation of the resource;

obtaining a resource user's usage measure indicating the estimated usage of the resource by the at least one resource user;

performing an update procedure for updating the resource usage measure with the resource user's usage measure by executing a cumulative algorithm averaging current and past values of the resource usage measure over time and the resource user's usage measure over the at least one resource user, wherein the cumulative algorithm is chosen from a plurality of cumulative algorithms based on the resource user's usage measure;

performing a checking procedure for comparing the updated resource usage measure with a pre-determined value indicating the necessity to perform a resource management action; and performing the resource management action according to the result of the checking procedure.

25. The system according to claim 24, wherein said system includes a charging unit and a third communication interface between said resource broker and said charging unit.

* * * * *